United States Patent Office 3,650,957
Patented Mar. 21, 1972

3,650,957
ETCHANT FOR CUPREOUS METALS
Charles R. Shipley, Jr., and Michael Gulla, Newton, Mass., assignors to Shipley Company, Inc., Newton, Mass.
No Drawing. Filed July 24, 1970, Ser. No. 58,200
Int. Cl. C09k 3/00; C23f 1/00
U.S. Cl. 252—79.1
23 Claims

ABSTRACT OF THE DISCLOSURE

This invention is for a solution for etching cupreous metals comprising a source of cupric ions, at least one complexing agent for cupric ions which agent is capable of forming a solution soluble copper (II) complex at solution pH, a source of bromide or chloride ions and a solution soluble molybdenum, tungsten or vanadium compound. Cupric etching solutions have been found to attack tin and tin-lead solder plate such as that used in the fabrication of printed circuit boards. The addition of a molybdenum, tungsten, or vanadium compound to the etching solution retards or eliminates such attack.

BACKGROUND OF THE INVENTION (1) Introduction

This invention relates to etching solutions and more particularly, to etching solutions for cupreous metals comprising cupric ions as a primary oxidant and a complexing agent for said cupric ions.

(2) Description of the prior art

The stripping of copper coatings from substrates is a commonly encountered industrial operation. Typical copper stripping methods involve the use of acidic ferric chloride, cupric chloride, or chromic acid solutions. These methods, though effective, are often impractical in areas where waste disposal is regulated by law as such solutions are frequently required to be treated at considerable expense before the exhausted solutions can be discarded.

Ferric chloride solutions typically comprise from about 28° to 42° Baumé ferric chloride in aqueous solution which results in relatively low pH, typically below 2.0. Cupric chloride etching solutions typically are 1 to 3 molar in cupric chloride and contain HCl, NaCl or $NH_4Cl$ as an additive. As with ferric chloride solutions, pH is typically maintained below about 2.0.

Problems are encountered with most commercially available etchants. The above-described ferric chloride and cupric chloride etchants all present disposal problems as they are highly corrosive and further, the metals in solution, particularly copper, will upset the role of bacteria required for sewage breakdown, as well as destroy plants and fish when dumped into natural waters. In addition, recovery of dissolved or precipitated metals is not economical even though the recovered metal values represent a potential asset.

Alkaline etchants useful above pH 8.5 and usually above pH 9.0 are also known. One such alkaline etchant for dissolving or stripping cuprous metal is disclosed in U.S. Pat. No. 3,231,503 and comprises a chlorite such as sodium chlorite as an oxidant in an alkaline solution containing an ammonium salt as a complexing agent for the metal stripped. The stripping solution is used at a pH of from 8 to 13 and preferably above pH 9. It is also disclosed in said patent that the useful life of the stripping solution can be extended upon exhaustion of the primary oxidant i.e., the chlorite by increasing the temperature to utilize dissolved copper in the cupric state as a secondary oxidant for further dissolution of copper converting the cupric copper to the cuprous form in the process. Consequently, at this stage of the etching operation, the etchant solution comprises an ammoniacal chloride solution of cupric ions as the sole oxidant having a pH between about 9 and 13. The chloride ions are provided by decomposition of the chlorite ions.

It has been found that the use of ammoniacal etchant solutions such as those described in the aforesaid Patent No. 3,231,503 create problems as the high pH required causes excessive fuming of ammonia which fumes are a health hazard to an operator and create a requirement for expensive exhaust equipment. Moreover, because ammonia is evolved from the system, replenishment with a fresh ammonium salt is required if the solution is to be used for an extended period of time.

In commonly-assigned co-pending U.S. patent application Ser. No. 58,170 filed concurrently herewith, there is disclosed an improved cupric etchant solution comprising a source of cupric ions, a non-fuming complexing agent for the cupric ions capable of forming a solution soluble copper (II) complex at solution pH and preferably, a source of bromide or chloride ions. A non-fuming complexing agent for cupric ions is defined as one that will not liberate appreciable ammonia fumes during etching.

The etching solution of said application is an improvement over the cupric etching solution of U.S. Pat. No. 3,231,503 due to the substantial elimination of ammonia fumes during the etching operation, thus resulting in the elimination of a need for expensive exhaust equipment. Another significant advantage of said application is the elimination of a need for constant replenishment with ammonium salt to replace that which is lost by fuming. There is the further advantage that pH need not be maintained above 8.0 to obtain effective etching or below 2.0, but is capable of being selected within the relatively broad pH range of from about 4.0 to 13.0, dependent upon the selection of the complexing agent and its solubility characteristics at any given pH and further, may be used at substantially neutral pH of from 6 to 8 and preferably, pH of from 7.0 to 7.8. Finally, the etching solutions of said application have a potential for continuous reuse without substantial regeneration or replenishment provided certain precautions are taken as described in said patent application.

It has been found that cupric etchants of the above described type attack tin and lead-tin masks in an etching operation. From a commercial sandpoint, this is a considerable disadvantage as such masks are frequently encountered in copper etching processes such as in the manufacture of printed circuit boards where a mask is typically provided to protect a copper conductor pattern.

STATEMENT OF THE INVENTION

The present invention provides a cupric etchant solution of the above-described type that does not attack tin or lead-tin solder mask. The etchant comprises a source of cupric ions as an oxidant, a complexing agent for cupric ions which is capable of forming a solution soluble copper (II) complex at solution pH, a source of chloride or bromide ions and a minor amount of a solution soluble molybdenum, tungsten or vanadium compound where said compound is responsible for substantially eliminating attack on tin or lead-tin solder mask.

The complexing agent for the cupric ions may be ammonia as disclosed in one embodiment of U.S. Pat. No. 3,231,503 or a non-fuming complexing agent as described in the aforesaid U.S. patent application Ser. No. 58,170.

DESCRIPTION OF THE PREFERRED EMBODIMENTS

Etching takes place in accordance with the following two reactions:

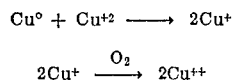

As represented above, one mole of divalent copper oxidizes one mole of metallic copper to two moles of monovalent copper which latter is then oxidized to divalent copper by aeration such as by bubbling air through the solution, spray etching or the like.

Substantially any cupric salt may be used as a source of cupric ions. Typical cupric salts include by way of example, cupric sulfate, cupric chloride, cupric nitrate, cupric acetate, and the like. The amount of cupric ion in the etchant solution is not critical, may vary within broad limits and to some extent is dependent upon the quantity of complexing agent used. A preferred range comprises from about 0.1 to 1.2 moles initially per liter of solution and more preferably from 0.2 to 0.6 mole per liter. Higher concentrations tend to increase etching rate. Where the invention of U.S. Pat. No. 3,231,503 is used, cupric ion need not be added initially, but may be derived as a secondary oxidant due to the etching operation.

The complexing agent in accordance with the invention is either ammonia as disclosed in U.S. Pat. No. 3,231,503 or a non-fuming complexing agent as described in the above noted U.S. patent application Ser. No. 58,170. Where ammonia is used as the complexing agent, it may be added to solution in the form of ammonium carbonate, ammonium sulphate, ammonium nitrate, ammonium chloride or the like. It is used in an amount dependent upon the amount of copper to be dissolved, the ammonia preferably being present in excess of the copper in a mole ratio of at least 2:1. Larger excesses are preferred to compensate for volatile of the ammonia. Where ammonia is used as the complexing agent, the etching solution must be used at a pH of least 8 and preferably between pH 9 and 13.

The complexing agent in accordance with application No. 58,170 serves to solubilize sufficient cupric to permit etching. In this respect, it should be noted that within the operable pH range of from 4 to 13, insufficient cupric ion is held in solution to provide a satisfactory etching rate. Increasing the concentration beyond the normal solubility limit by the addition of a complexing agent permits addition of enough cupric ion to provide a satisfactory etch rate which is defined for purposes of this invention as at least 0.1 mil copper per minute with solution agitation.

The selection of the complexing agent is not critical provided certain guidelines are followed. For example, the complexing agent must be non-fuming in accordance with this embodiment, that is, it will not liberate appreciable ammonia fumes during the etching operation. Consequently, ammonium hydroxide is not within the scope of the embodiment for its complexing capability through ammonium ions may be added in minor amount as an exaltant as will be described in greater detail below. Another requirement of the complexing agent is that it be capable of forming a solution soluble copper (II) complex at some range within the desired pH range of from 4 to 13 within which range the etchant should be used. Further, the copper (II) complex should dissociate in the solution to an extent that permits etching of copper at at least the minimum rate of 0.1 mil per minute. In this respect, it should be readily apparent that the extent of dissociation of a complex is dependent upon numerous facts such as solution pH, solution temperature, concentrations of various additives and the like. Thus, though a particular copper (II) complex may not dissociate to a sufficient extent under one set of operating conditions, it may dissociate sufficiently under a different set of operating conditions to provide a satisfactory etching rate. As a guideline only, the log of the stability constant ($K_1$) for a particular copper (II) complex should not exceed 18 and preferably should not exceed 12 at 25° C. Stability constants for a great number of copper (II) complexes are set forth in Mortell, Stability Constants of Metal-Ion Complexes, Special Publication No. 17, Section II, The Chemical Society, London, 1964, incorporated herein by reference.

Typical complexing agents for purposes of the present invention include hydroxy-carboxylic acids, especially aliphatic hydroxy-carboxylic acids, such as hydroxyacetic acid (glycollic acid), malic acid, tartaric acid, gluconic acid, lactic acid, and the like; polyalcohols such as glycerol, sorbitol, diethylene glycol and mannitol; keto-acids such as pyruvic acid and levulinic acid; polyamines, especially aliphatic polyamines such as trimethylamine, tetrahydroxypropylethylene diamine, pentahydroxypropyldiethylene triamine, and propylenediamine; heteroaliphatic dicarboxylic acids such as diglycollic acid; amino acids, especially aliphatic amino acids such as aminoacetic acid, alpha-aminopropionic acid, beta-aminopropionic acid, alpha-aminobutyric acid, iminodiacetic acid, minotriacetic acid, and ethylenediaminotetraacetic acid; alkanolamines such as monoethanolamine, diethanolamine, monoiispropanolamine, and diisopropanolamine, and pyrophosphates such as sodium and potassium pyrophosphate. Of the above, the alkanolamines are most preferred, as they provide the fastest etching rates and the alkylene amines are least preferred, as they provided the slowest etching rates. In this respect, it should be noted that the log of the stability constant for many alkylene amines is substantially higher than for many alkanolamines, thus substantiating to some extent, the theory set forth above regarding dissociation of the copper (II) complex.

Though lesser amounts of complexing agents may be used in solution, the amount preferably used is that sufficient to complex all of the cupric ion initially in solution and more particularly, the complexing agent is present in an amount of at least 1.5 times the amount necessary to complex all of the cupric ion originally in solution and most preferably at least five times the necessary amount to provide etching capacity. As should be apparent to those skilled in the art, the concentration of complexing agent used is dependent upon the type of ligand formed between the complexing agent and cupric ion—i.e., whether the ligand is monodentate, bidentate, tridentate or the like.

Ammonium ion is not required for the above-described etchants to operate, though it is desirable to add an ammonium salt as it acts as an exaltant for the etching rate. Typical exemplary ammonium salts include those listed above. The amount of ammonium salt is not critical and may vary broadly from no addition to less than that amount which causes appreciable fuming during the etching operation. The preferred range varies between 0.5 mole per liter of solution to 5 moles per liter and more preferably, from about 1 to 2 moles per liter of solution.

Where a non-fuming complexing agent is used, there is greater variation in permissible pH and the pH may vary between about 4 to 13 dependent upon the complexing agent used, its solubility characteristics at any given solution pH and additives in solution to prevent attack discussed below. It should be noted that when using a non-fuming complexing agent, the amount of the divalent copper oxidant is maintained substantially constant in solution by the solubilizing effect of the complexing agent with excess copper precipitating in a form believed to be the oxide or hydroxide. Thus, the etchant does not become supersaturated with copper. With removal of the copper precipitate periodically or continuously as it forms, the etchant can be used continuously provided that certain precautions are taken as will be discussed in greater detail below.

The chloride or bromide ion is also added to the etchant solution as an exaltant. It may be added in the form of cupric or ammonium chloride or bromide or in any other convenient form as would be obvious to the art such as in the form of sodium chloride or bromide. The function of this halide ion is not fully understood, but is believed to increase the etching rate possibly by acting as a solubilizer for cuprous copper formed on the surface of a copper part being etched. The chloride or bromide ion may be present in minor amount, the actual concentration not being critical. Preferably, it is present in solution in an amount of at least 0.1 mole per liter of solution and more preferably, in an amount of from 0.2 to 2.0 moles per liter. It appears that there is a synergism between the ammonium and halide resulting in substantially increased etching rates.

Molybdenum, tungsten or vanadium is added to the solution in the form of a soluble salt at solution pH. The particular compound used is not critical provided it does not adversely affect the etching operation. Representative examples of suitable compounds include molybdenum tetrabromide, molybdenum trichloride, molybdenum, trioxide, molybednum, pentaoxide, molybdenum oxydibromide, molybdenum oxydichloride, molybdenum oxypentachloride, molybdenum trisulfide, ammonium molybdate, tungsten hexabromide, tungsten oxydichloride, tungsten trisulfide, ortho and meta tungstic acid, sodium tungstate, vanadium dibromide, vanadium trifluoride, vanadium sesquioxide, sodium vanandate, vanadium oxydibromide, and vanadium pentaoxide. The above compounds have solubilities characteristics dependent upon solution pH. Consequently, it should be understood that since operable pH of various etchants of the invention varies between 4 and 13, for any given etchant, a molybdenum, tungsten, or vanadium compound should be selected that is soluble at the pH of the specific etchant. The preferred etchants have a pH varying between about 6 and 8 and more preferably between 7.0 and 7.8. Preferred additives within this pH range include ammonium molybdate, molybdenum trioxide, sodium tungstate, sodium vanandate and vanadium pentaoxide.

The amount of molybdenum, tungsten or vanadium compound added to the etchant is not critical, small amounts providing some benefits while larger amounts provide greater benefit until a maximum is reached beyond which no further improvement is realized. In general, the amount of molybdenum, tungsten or vanadium, expressed as the metal, may vary between 0.005 and 0.20 mole per liter of etchant.

As noted above, the etchants of the invention, using a non-fuming complexing agent, may be used over a wide range of pH varying between 4 and 13. However, in the most preferred embodiment of the invention, the etchants are used within the relatively neutral pH range of from about 6.0 to 8.0 and most preferably from about 7.0 to 7.8 because of the greater variety of available complexing agents, the lack of attack on substrate materials, photomasks, photoresists ease of handling, safety and the like. It is believed that operating at a neutral pH is unique in itself as neutral etchants have not heretofore been available in the marketplace.

The operating temperature for the etchant solution is not critical. Satisfactory results are obtained from below normal ambient room temperature to the boiling point of the etchant though it is generally desirable to maintain the temperature somewhat above room temperature, preferably between about 100 and 160° F. At higher temperatures, a faster etching rate is possible, thus increasing the number of available complexing agents useful for purposes of this invention.

A number of examples are given below for purposes of illustration wherein etching is conducted in a stagnant solution. Only a few of the possible modifications are specifically mentioned and it is not the purpose of these examples to limit the scope of the invention. Agitation of the solution will, of course, accelerate the rate of reaction indicated. In this respect, spray etching is much preferred to etching in a stagnant solution as the etch rate will be from 5 to 30 times faster. In all cases, aeration of some sort is necessary to convert cuprous to cupric.

EXAMPLES 1–20

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Ingredient (gm./l.): | | | | | | | | | | | | | | | | | | | | |
| Cupric chloride dihydrate | 50 | 50 | 50 | 50 | 50 | 50 | 50 | 50 | 50 | 50 | 50 | 50 | 50 | 50 | 50 | 50 | 50 | 50 | 50 | 50 |
| Monoethanolamine | 200 | 200 | 200 | 200 | 200 | 200 | 200 | | | | | | | | | | | | | |
| Tartaric acid | | | | | | | | 200 | 200 | 200 | 200 | 200 | 200 | 200 | 200 | 200 | 200 | | | |
| Ammonium chloride | 50 | 50 | 50 | 50 | 50 | 500 | 50 | 50 | 50 | 50 | 50 | 50 | 50 | 50 | 50 | 50 | 50 | 50 | 50 | 100 |
| Ammonium nitrate | | 25 | | | | | 25 | | 25 | | 100 | 100 | 100 | 100 | 100 | 100 | 100 | 100 | 100 | 100 |
| Ammonium molybdate | | | | | | | | | | | | 25 | 25 | | | | | | 25 | |
| Molybdic acid | | | | 15 | | | | | | | | | | | | | | | | |
| Sodium tungstate | | | 25 | | | | | | 25 | | | | | 25 | 25 | | | | | |
| Sodium vanadate | | | | | 25 | | | | | 25 | | | | | | 25 | 25 | | | |
| Vanadium pentaoxide | | | | | | 10 | | | | | | | | | | | | | | 25 |
| pH [1] | 7.5 | 7.5 | 7.5 | 7.5 | 7.5 | 7.5 | 9.2 | 7.5 | 7.5 | 7.5 | 7.5 | 5.0 | 9.4 | 5.0 | 9.3 | 5.0 | 9.3 | 8.5 | 8.5 | 9.0 |
| Effect: [2] | | | | | | | | | | | | | | | | | | | | |
| LT-27 [3] | 100 | 50 | 50 | 70 | 0 | 25 | 10 | 100 | 75 | 70 | 75 | 80 | 0 | | | | | 25 | 0 | 0 |
| Solder plate [4] | 100 | 10 | 20 | 50 | 10 | 50 | 0 | 50 | 20 | 20 | 0d | 70 | 10d | 50d | 20 | 70 | 0d | 25 | 0 | 0 |
| Tinplate [5] | 100 | 10 | 20 | 10 | 10 | 25 | 0 | 60 | 10 | 10 | 0 | 20d | 0 | | | | | 25 | 0 | 0 |
| LT-27 [3] | 20 | 0 | | 0 | 0 | | | 100 | 50 | 5 | 50 | | | | | | | 15 | 0 | 5 |
| Solder plate [4] | 50d | 0 | | 0 | 0d | | | 50d | 0d | 0 | 0d | | | | | | | 25 | 5 | 5 |
| Tinplate [5] | 100 | 0 | | 10 | 0 | | | 50 | 10 | 5 | 0d | | | | | | | 25 | 0 | 0 |

[1] Initial pH of solution adjusted with either hydrochloric acid or sodium hydroxide to value indicated.
[2] To determine effect of etchant, samples having the indicated tin or lead-tin plate were immersed in etchant maintained at 125° F. for 5 minutes. Results are given in terms of percentage of surface of plate destroyed (severely etched). The letter "d" indicates the plate was discolored. The first 3 figures per example under the heading effect represents effect in a fresh solution while the latter 3 figures represent effect with a used solution—one having dissolved about 6 ounces of copper per gallon.
[3] LT-27 refers to an immersion tin deposit.
[4] Solder plate refers to deposit electroplated tin-lead alloy containing about equal amounts of each.
[5] Tinplate refers to electroplated tin.

From the above, it can be seen that the molybdenum, vanadium and tungsten additives reduced the attack on tin and tin-lead plate in all cases, though the effect is not the same in all cases with some examples showing significantly greater improvement than others.

We claim:

1. In an etching solution for copper comprising a source of cupric ions as an oxidant for copper, a complexing agent for said cupric ions capable of forming a solution soluble copper (II) complex at solution pH, and a member selected from the group of chloride ions and bromide ions which solution has a pH varying between about 4 and 13, the improvement comprising the addition of a member selected from the group of molybdenum, tungsten and vanadium ions in an amount sufficient to substantially retard attack on tin and tin-lead plate.

2. The etching solution of claim 1 where the complexing agent is ammonia and the pH of the solution varies between 8 and 13.

3. The etching solution of claim 1 where the complexing agent is a non-fuming complexing agent capable of forming a solution soluble copper (II) complex at solution pH which copper (II) complex is capable of sufficient dissociation in solution under operating conditions to permit etching of copper at a rate of at least 0.1 mil per minute.

4. The etching solution of claim 3 having a pH varying between about 6 and 8.

5. The etching solution of claim 3 having a pH varying between about 7.0 and 7.8.

6. The etching solution of claim 1 where the cupric ions are present initially in an amount of from about 0.1 to 1.2 moles per liter and the complexing agent is present in an amount sufficient to at least complex with all of said cupric ions.

7. The etching solution of claim 1 where the chloride or bromide ions are present in an amount of from 0.2 to 2.0 moles per liter of solution.

8. The etching solution of claim 1 where the molybdenum, vanadium or tungsten ions are present in an amount of from 0.005 to 2.0 moles per liter of solution.

9. The etching solution of claim 3 containing ammonium ions in an amount of from 0.5 to 5.0 moles per liter of solution.

10. The etching solution of claim 3 containing chloride ions in an amount of from 0.2 to 2.0 moles per liter of solution and ammonium ions in an amount of from 0.5 to 5.0 moles per liter of solution.

11. The etching solution of claim 10 where the log of the stability constant ($K_1$) of the copper (II) complex does not exceed about 18 at 25° C.

12. The etching solution of claim 10 where the log of the stability contstant ($K_1$) of the copper (II) complex does not exceed about 12 at 25° C.

13. The etching solution of claim 11 where the complexing agent is a member selected from the group of alkylene amines, alkanolamines, amino carboxylic acids, hydroxy carboxylic acids, polyalcohols, polyamines, heteroaliphatic dicarboxylic acids, amino acids and pyrophosphates.

14. The etching solution of claim 13 where the complexing agent is an alkanolamine.

15. In an aqueous etching solution for copper comprising a source of cupric ions as an oxidant for copper and at least one non-fuming complexing agent for said cupric ions, said complexing agent being capable of forming a solution soluble copper (II) complex at solution pH and said copper (II) complex being capable of sufficient dissociation in solution under operating conditions to permit etching copper at a rate of at least 0.1 mil per minute, said aqueous etching solution having a pH of from about 4 to 13, the improvement comprising the addition of a member selected from the group of molybdenum, tungsten and vanadium in an amount sufficient to substantially retard attack on tin and tin-lead plate.

16. The etching solution of claim 15 containing as exaltant at least one member selected from the group of chloride ions, bromide ions and ammonium ions.

17. The etching solution of claim 16 where the cupric ions are present initially in an amount of from 0.1 to 1.2 moles per liter of solution and the complexing agent is present in an amount sufficient to at least complex with all of said cupric ions.

18. The etching solution of claim 16 also containing chloride ions in an amount of from 0.2 to 2.0 moles per liter of solution and ammonium ions in an amount of from 0.5 to 5.0 moles per liter of solution.

19. The etching solution of claim 18 where the log of the stability constant ($K_1$) of the copper (II) complex does not exceed about 18 at 25° C.

20. The etching solution of claim 18 where the log of the stability constant ($K_1$) of the copper (II) complex does not exceed about 12 at 25° C.

21. The etching solution of claim 20 where the complexing agent is a member selected from the group of alkylene amines, alkanolamines, hydroxy carboxylic acids, amino carboxylic acids, polyalcohols, polyamines, heteroaliphatic dicarboxylic acids, amino acids and pyrophosphates.

22. The etching solution of claim 20 where the complexing agent is an alkanolamine.

23. The etching solution of claim 15 where the molybdenum, tungsten or vanadium ions are present in an amount of from 0.005 to 2 moles per liter of solution.

References Cited

UNITED STATES PATENTS

| | | | |
|---|---|---|---|
| 2,887,373 | 5/1959 | Winkler et al. | 156—18 X |
| 2,908,557 | 10/1959 | Black et al. | 252—79.2 X |
| 2,942,954 | 6/1960 | Thomas | 156—18 |
| 3,361,674 | 1/1968 | Miller et al. | 252—79.1 |
| 3,466,208 | 9/1969 | Slominski | 156—18 |
| 3,507,795 | 4/1970 | Gardner | 134—41 X |

WILLIAM A. POWELL, Primary Examiner

U.S. Cl. X.R.

156—18; 252—79.4